United States Patent [19]

Pfohl

[11] Patent Number: 4,931,536

[45] Date of Patent: Jun. 5, 1990

[54] HYDROXY FUNCTIONAL ACRYLAMIDOMETHYL AMINO RESINS

[75] Inventor: William F. Pfohl, Wilbraham, Mass.

[73] Assignee: Monsanto Company, St. Louis, Mo.

[21] Appl. No.: 199,419

[22] Filed: May 27, 1988

[51] Int. Cl.$^5$ ..................... C08G 59/00; C08G 12/32
[52] U.S. Cl. ................................... 528/250; 528/254; 528/258; 544/196
[58] Field of Search ....................... 528/250, 254, 258; 544/196

[56] References Cited

U.S. PATENT DOCUMENTS 4,582,894  4/1986  Pfohl ................................... 528/250

Primary Examiner—John Kight, III
Assistant Examiner—Frederick Krass
Attorney, Agent, or Firm—R. Bruce Blance; William J. Farrington

[57] ABSTRACT

Hydroxy functional acrylamido amino resins comprising hydroxy-hydrocarbyl groups. The resins are produced by reaction of alkoxymethyl amino resins with acrylamide to introduce acrylamidomethyl groups and then with a polyol to introduce hydroxy functionality. The hydroxy functional acrylamido amino resins may be epoxidized to form polyglycidamides which can then be formulated with epoxy reactants to provide curable epoxy systems.

12 Claims, No Drawings

HYDROXY FUNCTIONAL ACRYLAMIDOMETHYL AMINO RESINS

This invention relates to hydroxy functional unsaturated resins and more particularly it relates to hydroxy functional acrylamidomethyl amino resins.

A class of epoxy compounds, namely polyglycidamides has been disclosed which may be blended with polyamines and other epoxy-reactive oligomers to provide crosslinkable systems. Rapid cure of the polyglycidamides with amine functional coreactants can be achieved under ambient conditions to give cured products which possess exterior durability and are therefore useful to provide products capable of withstanding exterior weathering. However, the polyglycidamides react very sluggishly with anhydrides and such cured products generally possess unsatisfactory properties.

I have now discovered that the introduction of hydroxy functionality into the polyglycidamides provides polyglycidamides which crosslink readily with anhydrides and provide cured compositions which are hard, solvent resistant and weather resistant.

The polyglycidamides are prepared by methylolating cyclic ureas and aminotriazines with formaldehyde, etherifying with a $C_1$ to $C_{10}$ alcohol, such as methanol, ethanol, 1-propanol, 2-methyl-1-propanol 1-butanol, or 2-ethyl-1-hexanol to produce an alkoxymethyl product, transetheramidizing the alkoxymethyl product with an acrylamide to replace a fraction of the alkoxymethyl groups with acrylamidomethyl groups, transetherifying with a polyol containing at least two hydroxy groups, to replace a further fraction of the alkoxymethyl groups with (hydroxysubstituted alkoxy) methyl groups and epoxidizing with an epoxidation agent.

The present invention is directed to the hydroxy functional acrylamidomethyl amino resins which are precursors of these polyglycidamides. They are represented by the following structural formula:

$Y(R)_m$ wherein Y is a nucleus selected from the group consisting of:

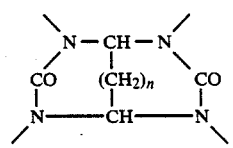
(a)

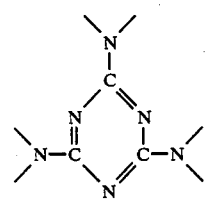
(b)

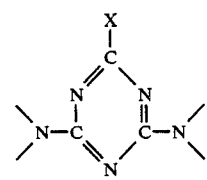
(c)

and

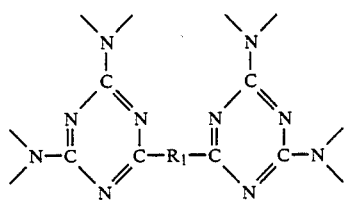
(d)

wherein R is selected from the group consisting of:

| | |
|---|---|
| $(CH_2O)_pR_2$; | A. |
| $CH_2OR_3$; | B. |

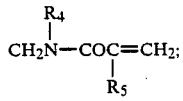
C.

$(CH_2O)_qCH_2R_6$   D.

wherein $R_1$ is a $C_1$ to $C_{10}$, linear or branched or cyclic, saturated or unsaturated divalent hydrocarbyl radical;

wherein $R_2$ is H, or a $C_1$ to $C_{10}$, linear or branched or cyclic, saturated or unsaturated aliphatic or aromatic monovalent hydrocarbyl radical but not more than one $R_2$ per Y nucleus is H;

wherein $R_3$ is a $C_2$ to $C_{10}$ linear or branched or cyclic, hydrocarbyl radical substituted with at least one hydroxy;

wherein $R_4$ and $R_5$ are independently selected from hydrogen and methyl;

wherein $R_6$ is $[Y(R)_{m-2}\text{-}(CH_2O)_r\text{-}CH_2]_s\text{-}Y(R)_{m-1}$;

wherein X is a $C_1$ to $C_{10}$ linear or branched or cyclic, saturated or unsaturated aliphatic or aromatic monovalent hydrocarbyl radical;

wherein m is the equivalence of the Y nucleus and is in the range of 4 to 12;

wherein n, p, q and r are independently selected in the range of 0 to 1;

wherein the average s is in the range of 0 to 2;

wherein the average number of A groups per Y nucleus is in the range of 0 to 3, the average number of B groups is in the range to provide from 0.3 to 10 hydroxy substituents per molecule, the average number of C groups is in the range of 2 to 10 per molecule and wherein the average number of Y nuclei per molecule is in the range of about 1 to about 4. Preferably the average number of B groups is in the range to provide from 1 to 3 hydroxy substituents per molecule and the average number of C groups is in the range of about 2 to about 6 per molecule.

Suitable Y nuclei are provided by melamine, N-alkyl melamines such as N, N',N"-trimethyl melamine, guanamines such as acetoguanamine, benzoguanamine, glutaroguanamine, and adipoguanamine, and cyclic ureas such as glycouril (the condensation product of glyoxal and urea), and the condensation product of malonaldehyde and urea.

The hydroxy functional acrylamidomethyl amino resins of this invention can be prepared by methylolating cyclic ureas and aminotriazines with formaldehyde, etherifying with a $C_1$ to $C_{10}$ alcohol, such as methanol, ethanol, 1-propanol, 2-methyl-1-propanol, 1-butanol, or 2-ethyl-1-hexanol to produce an alkoxymethyl product, and transetheramidizing the alkoxymethyl product with an acrylamide to replace a fraction of the alkoxymethyl groups with acrylamidomethyl groups, and transetherifying with a polyol containing at least two hydroxy groups, to replace a further fraction of the alkoxymethyl groups with (hydroxysubstituted-alkoxy) methyl groups.

The preferred hydroxy functional acrylamidomethyl amino resins are oligomeric mixtures, in which Y is a melamine nucleus, the A group is $CH_2OR_2$ or H, $R_2$ being methyl, butyl, isobutyl or 2-ethylhexyl, the B group is as defined hereinabove, and the C group is $CH_2NHCOCH=CH_2$ there being on average 0 to 1 H groups and 0 to 3 $CH_2OR_2$ groups, per melamine nucleus, the average number of melamine nuclei per molecule being in the range of about 1 to about 3, and there being sufficient number of B groups to provide an average number of hydroxy groups per molecule in the range of 0.4 to 4 and there being on average from 2 to 6 acrylamidomethyl groups per molecule.

In a preferred procedure for making the products of the present invention an unsaturated condensate is obtained by condensation of a $C_1$ to $C_4$ alkoxymethylmelamine with the appropriate amount of acrylamide to obtain about 2.5 to 4.0 amide groups per nucleus. The initial $C_1$ to $C_4$ alkoxymethylmelamine preferably contains at least about five alkoxymethyl groups per melamine ring and is obtained by reaction of formaldehyde and melamine and etherification of the methylolmelamine product under conditions well known in the art to minimize the amount of oligomerization which can occur by formation of methylene or methylene ether bridges. The average degree of oligomerization is preferably less than about 2 and preferably the etherified methylolmelamine is the substantially fully etherified and fully methylolated melamine with a degree of methylolation of about 5 to 6 and a degree of etherification of at least about 5.

The acrylamide which is used in the condensation can be represented by the formula:

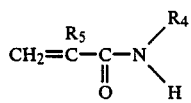

where $R_4$ and $R_5$ are as defined hereinabove. The preferred acrylamide is acrylamide in which $R_4$ and $R_5$ are both hydrogen.

The condensation reaction is carried out in the presence of a catalytic amount of an acid catalyst selected from the group consisting of protonic acids of pKa less than about 2 and Lewis acids. To prevent polymerization or oxidation of the unsaturated melamine condensate and the acrylamide during the condensation reaction, a polymerization and oxidation inhibiting quantity of an inhibitor is added to the reaction mixture. Excess of inhibitor should be avoided since it can cause color development. Effective inhibitors include hydroquinone, ethers of hydroquinone, and quinone.

After the acrylamide units have been inserted into the molecule, the product is transetherified with polyol under conditions which allow the polyol to be linked to the triazine or glycouril nucleus by oxymethylene bridges while minimizing the amount of crosslinking or chain extension which might occur by further reaction of the polyol. Indeed to minimize such crosslinking or chain extension, it is advantageous to select a $C_3$ to $C_{10}$ diol as the polyol, in which one hydroxy group is primary and one is secondary to provide hydroxies of different reactivity so that the hydroxy substituent of the B group defined hereinabove is predominantly secondary. Such diols are preferably selected from the group consisting of 1-2,propanediol, 1,2-butanediol, 1,2-pentanediol, 1,2-hexanediol, 1,2-heptanediol, 1,2-octanediol, 1,2-nonanediol, 1,2,decanediol, 2-methyl-1,3-pentanediol, 2-ethyl-1,3-hexanediol, and 2-propyl-1,3-heptanediol.

The thus prepared hydroxy functional acrylamidomethyl amino resin is used as a precursor for epoxidized amino resins or polyglycidamides. Epoxidation is preferably effected with a mixture of hydrogen peroxide and a nitrile of the formula $R_7-C\equiv N$ in a mole ratio of about 1:1 or a peroxycarboximidic acid of the formula

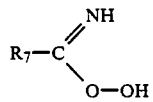

wherein $R_7$ denotes either a saturated alkyl, cycloalkyl or aryl radical. The peroxycarboximidic acid is presumed to be formed in situ when a mixture of hydrogen peroxide and a nitrile is used. Suitable nitriles for the epoxidation include, but are not limited to acetonitrile, adiponitrile and benzonitrile.

Advantageously, the epoxidation with hydrogen peroxide and a nitrile is carried out under alkaline conditions at an initial pH of about 13 which falls to about 8.5 as reaction proceeds. The reaction temperature may be in the range of about 30 to about 65° C., preferably 55° to 65° C. Advantageously the epoxidation is carried out with an excess of hydrogen peroxide up to 2.5 equivalents based on the unsaturated amide groups. If there are ethylenically unsaturated groups in addition to the amide unsaturation they may also be epoxidized. The excess is preferably in the range of 2.0 to 2.5 equivalents.

Other methods of epoxidation include the use of other oxidizing agents such as peroxyacids formed by the reaction of the oxides of transition metals of groups IVB, VB and VIB, oxides of arsenic and boron, or tungstic and molybdic acid with hydrogen peroxide at a pH of 4-6.

Peracids may also be used to effect epoxidation. The peracids, which are aliphatic or aromatic, are formed in situ or are pre-formed and include performic acid, peracetic acid, perbenzoic acid and trichloroperacetic acid. They may be pre-formed by the reaction of a carboxylic acid with hydrogen peroxide in the presence of a strong acid catalyst such as sulfuric acid or sulfonic acids. Sulfonic acid cation exchange resins can also be used as the strong acid catalyst.

The following examples are for illustration only and are not intended to limit the scope of the invention. All the parts and percentages are by weight unless otherwise indicated.

EXAMPLE 1

This example describes the preparation of a hydroxy functional polyglycidamide or epoxy melamine from a mixed methyl butyl etherified methylolmelamine via the hydroxy functional acrylamidomethylmelamine intermediate.

230 parts of a mixed methyl butyl etherified methylolmelamine (melamine:formaldehyde:methanol: butanol of a ratio of 1:5.5:2.9:2.1), 100.84 (1.375 mol) parts of acrylamide and 0.05 parts of hydroquinone are charged to a 2-liter reactor, stirred and heated to 75° C. to dissolve the acrylamide. A solution of 0.92 parts of methane sulfonic acid dissolved in 0.92 parts of n-butanol is added. Heat is reduced and the reaction temperature continues to increase to 85°-90° C. The temperature is held at 85°-90° C. for ten minutes and then the pressure is reduced to −40.6 kPa while the reaction temperature is held at 85°-90° C. Distillate is collected in a dry ice cooled receiver. Temperature and pressure are adjusted to 90° C. and −95.5 kPa over a twenty minute period, while 43.3 parts of distillate are collected. The vacuum is released and 111.18 parts of n-butanol are added and the temperature is held at 80°-85° C. for ten minutes. The pressure is then reduced to −67.7 kPa and distillate is collected in a dry ice cooled receiver. Temperature and pressure are adjusted to 88° C. and −94.8 kPa over a twenty-five minute period. Vacuum is released and 111.18 parts of n-butanol and 38.05 parts of 1,2-propanediol are added. The temperature is held at 80°-85° C. for ten minutes and then the pressure is reduced to −81.3 kPa while continuing to collect distillate. Temperature and pressure are adjusted to 95° C. and −93.2 kPa over a forty-five minute period while collecting a total of 207.25 parts of distillate. The vacuum is released. The product is a hydroxy functional acrylamidomethylmelamine containing 2.74 equivalents of acrylamide and 0.86 equivalents of hydroxyl per triazine nucleus. To the hydroxy functional acrylamidomethylmelamine in the molten state 456 parts of acetonitrile are slowly added at a rate to dissolve the molten mass without extreme build-up in viscosity. When solution is complete, 62.2 parts of water and 2.82 parts of 20% potassium hydroxide are added. The reaction mixture is then cooled to 60° C. The solids content is about 40 percent. Then 2.35 parts of 20% potassium hydroxide are added to increase the pH to 13-14. 234 parts of 50% hydrogen peroxide and 102.8 parts of 20% potassium hydroxide are added over a three hour period to maintain a temperature of 60° C. and a slow decrease in pH to about 8.6. The reaction is slightly exothermic and requires some external cooling. When the additions are complete, 13.1 parts of 90% formic acid are added to adjust the pH to 5.6-6.2. Acetonitrile is removed by vacuum distillation by slowly reducing the pressure to −100 kPa over a two hour period and allowing the temperature to drop to 35° C. To the residual product is added 400 parts of water and the mixture is stirred for fifteen minutes at 30° C. The stirring is stopped and the resin allowed to settle for fifteen minutes. Water is decanted and the washing cycle is repeated two more times. After the washing procedure is completed, 500 parts of propylene glycol monomethyl ether are added and the mixture is stirred at 30°-35° C. to dissolve resin. Residual water is removed via azeotropic distillation with an additional 250 parts of propylene glycol monomethyl ether at 40°-45° C. and −98.2 kPa over a three hour period. The product solution is then filtered and cooled to give the hydroxy functional epoxy melamine product at 60-62% solids by weight in propylene glycol monomethyl ether. The yield of product is about 70%. It has an epoxy equivalent weight of 312 by Fourier Transform $^{13}$C-Nuclear Magnetic Resonance analysis with a GE-300 instrument, operated under a pulse delay of 60s, pulse width of 17.25 μsec, with gated decoupling, spectral width of 20 kHz, the number of acquisitions being in the range of 500-1000, 16K data points being taken and the magnetic field being set at 75.46 MHz for $^{13}$C. and 300 MHz for $^1$H.

EXAMPLE 2

This example describes the preparation of the hydroxy functional melamine of Example 1 on a larger scale. All parts by weight were increased by a factor of ten. Epoxidation under the same conditions as Example 1 gives the hydroxy functional epoxy melamine in 71% yield with an epoxy equivalent weight of 321 with about 1 equivalent of hydroxy functionality per triazine nucleus.

EXAMPLE 3

This example describes the preparation of a hydroxy functional acrylamidomethylmelamine and a hydroxyfunctional epoxy melamine resin with a higher level of hydroxy functionality than those of Example 2.

322.0 parts of a mixed methyl butyl etherified methylolmelamine, 141.1 parts of acrylamide, 0.07 parts of hydroquinone, and 79.91 parts of 1,2-propanediol are charged to a 2-liter reactor, stirred and heated to 70° C. to dissolve the acrylamide. A solution of 1.29 parts of methane sulfonic acid in 1.29 parts of methanol are added. Heat is reduced and the reaction temperature continues to increase to 80°-85° C. The temperature is held at 80°-85° C. for ten minutes and then the pressure is reduced to −71.1 kPa while the reaction temperature is held at 85°-90° C. Distillate is collected in a dry ice cooled receiver. Temperature and pressure are adjusted to 89° C. and −98.2 kPa over a 100-minute period while 107 parts of distillate are collected. The vacuum is released and 598.5 parts of acetonitrile are slowly added to the hot molten reaction mixture at a rate to dissolve the reaction mass without extreme build-up in viscosity. When solution is complete, 66.5 parts of water and 3.95 parts of 20% potassium hydroxide are added. The reaction mixture is then cooled to 60° C. The solids content is about 40%. Then 7.05 parts of 20% potassium hydroxide are added to increase the pH to 13-14. 294.6 parts of 50% hydrogen peroxide and 70.5 parts of 20% potassium hydroxide are added over a three hour period to maintain a temperature of 60° C. and a slow decrease in pH to about 8.1. The reaction is slightly exothermic and requires some external cooling. When the additions are complete, 5.5 parts of 90% formic acid are added to adjust the pH to 5.6-6.2. Acetonitrile is removed by vacuum distillation by slowly reducing the pressure to −88.1 kPa over a two hour period and allowing the temperature to drop to 44° C. To the residual product is added 500 parts of water and the mixture is stirred for fifteen minutes at 30°-35° C. The stirring is stopped and the resin allowed to settle for fifteen minutes. Water is decanted and the washing cycle is repeated two more times. After the washing procedure is complete, 500 parts of propylene glycol monomethyl ether are added and the mixture is stirred at 35° C. to dissolve resin. Residual water is removed via azeotropic distillation with an additional 700 parts of propylene glycol monomethyl ether at 40°-45° C. and −94.8 kPa over a 150 minute period. The product solution is then filtered and cooled to give the hydroxy functional epoxy melamine product at 55% solids by weight in propylene glycol monomethyl ether. The yield of product is about 51%. It has an epoxy equivalent weight of 363 y Fourier Transform $^{13}$C-Nuclear Magnetic Resonance, with about 1.2–1.5 hydroxy equivalents per triazine nucleus.

EXAMPLE 4

This example describes the preparation of a hydroxy functional acrylamidomethylmelamine and a hydroxy functional epoxy melamine with a higher hydroxyl content than that of Example 3.

An unsaturated resin is prepared by the procedure of Example 3 except that the mixed methyl butyl etherified methylolmelamine is reacted with 141.1 parts of acrylamide and 106.5 parts of 1,2-propanediol. Epoxidation of this material under the same conditions as Example 3 gives the hydroxy functional epoxy melamine resin in about 35% yield. It has an epoxy equivalent weight of 312 and about 2 hydroxyl equivalents per triazine nucleus.

EXAMPLE 5

This example describes the preparation of an acrylamidomethylmelamine and an epoxy melamine resin with a high hydroxyl level but with a higher yield than that of Example 4 by use of a hydrophobic diol.

322 parts of a mixed methyl butyl etherified methylolmelamine, 141.1 parts of acrylamide, 126.2 (1.4 mol) parts of 1,3-butanediol, and 0.07 parts of hydroquinone are charged to a 2-liter reactor, stirred and heated to 70° C. to dissolve the solid acrylamide. A solution of 1.29 parts of methane sulfonic acid in 1.29 parts of methanol are added. Heat is reduced and the reaction temperature continues to increase to 80°–85° C. The temperature is held at 80°–85° C. for ten minutes and then the pressure is reduced to −67.7 kPa while the reaction temperature is held at 80°–90° C. Distillate is collected in a dry ice cooled receiver. Temperature and pressure are adjusted to 90° C. and −98.2 kPa over a one hour period while 133 parts of distillate are collected. The vacuum is released and 686.2 parts of acetonitrile are added slowly to the hot molten reaction mixture at a rate to dissolve the resin without extreme build-up in viscosity. When solution is complete, 76.2 parts of water and 3.95 parts of 20% potassium hydroxide are added. The reaction mixture is cooled to 60° C. The solids content is about 40%. Then 7.05 parts of 20% potassium hydroxide are added to increase the pH to 13–14. 294.6 parts of 50% hydrogen peroxide and 75.2 parts of 20% potassium hydroxide are added over a three hour period to maintain a temperature of 60° C. and a slow decrease in pH to 8.1. The reaction is slightly exothermic and requires some external cooling. When the additions are complete, 7.9 parts of 90% formic acid are added to adjust the pH to 5.6–6.2. Acetonitrile is removed via vacuum distillation by slowly reducing the pressure to −94.8 kPa over a three hour period and allowing the temperature to drop to 35° C. Vacuum is released and 500 parts of water are added to the residual product and the mixture is stirred for fifteen minutes at 30°–35° C. The stirring is stopped and the resin allowed to settle for fifteen minutes. Water is decanted and the washing cycle is repeated two more times. After the washing procedure is complete, 500 parts of propylene glycol monomethyl ether are added and the mixture is stirred at 35° C. to dissolve resin. Residual water is removed via azeotropic distillation with an additional 850 parts of propylene glycol monomethyl ether at 40° C. and reduced pressure of −96.5 kPa over a nine hour period. The product solution is then filtered and cooled to give the hydroxy functional epoxy melamine at 53% solids by weight in propylene glycol monomethyl ether. The yield of product is about 68%. It has an epoxy equivalent weight of 367 and about 2.0 hydroxyl equivalents per triazine nucleus.

EXAMPLE 6

This example describes the preparation of a hydroxy functional acrylamidomethylmelamine and a hydroxy functional epoxy melamine with a high hydroxyl level and yield by use of a more hydrophobic diol than that of Example 5.

An hydroxy functional unsaturated resin is prepared by the procedure of Example 5 except that the mixed methyl butyl etherified methylolmelamine is reacted with 141.1 parts of acrylamide and 204.7 (1.4 mol) parts of 2-ethyl-1,3-hexanediol. Epoxidation of this material under the same conditions as Example 5 gives a hydroxy functional epoxy melamine resin in 83% yield. It has an epoxy equivalent weight of 468 with about 2 equivalents of hydroxyl functionality per triazine nucleus.

EXAMPLE 7

This example describes the preparation of a more flexible, higher reactivity (less stable) hydroxy functional epoxy melamine by use of a diprimary alkanediol to prepare the intermediate hydroxy functional acrylamidomethylmelamine.

230 parts of a mixed methyl butyl etherified methylolmelamine, 73.3 (1.0 mol) parts of acrylamide and 0.04 parts of hydroquinone are charged to a 2-liter reactor, stirred and heated to 75° C. to dissolve solid acrylamide. A solution of 0.92 parts of methane sulfonic acid in 0.92 parts of methanol are added, heat is reduced and the reaction temperature continues to increase to 80°–85° C. The temperature is held at 80°–85° C. for ten minutes and then the pressure is reduced to −71.1 kPa while maintaining a reaction temperature of 85°–90° C. Temperature and pressure are adjusted to 90° C. and −94.8 kPa over a fifteen minute period while 38.3 parts of distillate are collected. The vacuum is released and 29.6 (0.25 mol) parts of 1,6-hexanediol are added and the temperature is held at 80° C. for five minutes. Pressure is then reduced to −93.2 kPa and a total of 13.3 parts of distillate is collected over an eight minute period. Vacuum is released and 500 parts of acetonitrile is added slowly to the hot molten reaction mixture at a rate to dissolve resin without extreme build-up in viscosity. When solution is complete, 68 parts of water and 2.8 parts of 20% potassium hydroxide are added. The reaction mixture is then cooled to 55° C. and 4.1 parts of 20% potassium hydroxide are added to increase the pH to 13–14. 170 parts of 50% hydrogen peroxide and 73.4 parts of 20% potassium hydroxide are added over a three hour period to maintain a reaction temperature of 60° C. and a slow decrease in pH to 8.8. The reaction is slightly exothermic and requires some external cooling. When the additions are complete, 10.8 parts of 90% formic acid are added to adjust the pH to 5.6–6.2. Acetonitrile is removed via vacuum distillation by slowly reducing pressure to −97.6 kPa over a 95 minute period and allowing the temperature to drop to 30° C. To the residual product is added 300 parts of water and the mixture is stirred for fifteen minutes at 30°–35° C. The stirring is stopped and the resin is allowed to settle for five minutes. Water is decanted and the wash cycle is repeated two more times. After the washing procedure is complete, 500 parts of propylene glycol monomethyl ether are added and the mixture stirred at 30°-35° C. to dissolve resin. Residual water is removed via azeotropic distillation with an additional 300 parts of propylene glycol monomethyl ether at 40°-45° C. and −96.5 kPa over a four hour period. The product solution is filtered and cooled to give a chain extended hydroxy functional epoxy melamine product at 55% solids by weight in propylene glycol monomethyl ether. It has an epoxy equivalent weight of 471 by Fourier Transform $^{13}$C-Nuclear Magnetic Resonance and about 0.4 primary hydroxyl groups per triazine nucleus.

EXAMPLE 8

This example is prepared by the method set forth in Example 3 of U.S. Pat. No. 4,582,894 to provide a non-hydroxy functional polyglycidamide for the purpose of comparison with the examples of hydroxy functional polyglycidamides of Examples 1-7.

EXAMPLE 9

This example illustrates the preparation of a hydroxy functional acrylamidomethylbenzoguanamine and the polyglycidamide epoxy product. One mole of fully methylated methylolbenzo-guanamine resin is reacted with 2 moles acrylamide, followed by 1 mole of 1,2-propanediol and the product is epoxidized according to the procedures of Example 1.

EXAMPLE 10

A hydroxy functional acrylamidomethylglycouril and the corresponding polyglycidamide are prepared by the procedures of Example 1 in which one mole of fully methylated methylol glycouril resin is reacted with 2 moles of acrylamide, then 1 mole of 1,2-propanediol and the product is epoxidized.

The polyglycidamide compositions of the present invention may be formulated into coating, laminating, encapsulating, adhesive, polymeric foam, and potting systems by adding any conventional epoxy reactants such as polyamines, anhydrides, polyols, polycarboxylic acids etc. The polyamines include aliphatic amines, such as ethylene diamine, hexamethylene diamine, triamino-nonane, methyl nonane diamine, triethylene tetraamine and imino-bispropylamine, cyclic alphatic amines such as menthane diamine and N-amino ethyl piperazine, aromatic amines such as diaminobenzene, 4,4'diamino diphenyl sulfone, 4,4' methylene dianiline, 4,4' diaminodiphenyl ether, polyether amines such as N-hydroxy ethyl diethylene triamine and N-(2 hydroxy propyl) ethylene diamine and poly(oxypropylene) di-amine, and polyamide amines such as amido poly-amines, imidazoline polyamines, dimer acid polyamines and dicyandiamide. The anhydrides include succinic, maleic, citraconic and itaconic anhydrides and polyanhydrides such as pyrometallitic dianhydride, benzophenone-tetracarboxylic acid dianhydride, mellitic trianhydride and anhydride functional oligomers and polymers containig copolymerized maleic anhydride units, itaconic anhydride units and citraconic anhydride units. The polyols include ethylene glycol, propylene glycol pentaerythritol, trimethylolethane, trimethylolpropane, trimethylolnonane and polyetherpolyols such as polyethylene glycols and polypropylene glycols. The polycarboxylic acids include adipic, succinic and azelaic acids, carboxy terminated polyesters, carboxy termi-nated acrylics and dimer and trimer fatty acids. When the hydroxy functional polyglycidamides of the present invention are formulated with anhydride compounds, they can be made to react readily at room temperature to provide crosslinked products.

Coating systems of hydroxy functional polyglycidamide and epoxy-reactant vehicles can be made by dissolving the reactants in solvents such as aliphatic esters and ketones and mixtures thereof and mixtures containing aliphatic hydrocarbons. The solutions can be used at any dilution which is convenient for application of such coating compositions to a substrate. The coating compositions may include up to 70 weight percent conventional aromatic epoxies. Preferably the solids of the coating compositions are greater than about 40 weight percent and even more preferably greater than about 55 weight percent. Advantageously, the ratio of the epoxy groups of the crosslinker to the epoxy reactive groups of the vehicle is in the range of about 0.8 to about 2.2. Preferably the ratio is in the range of about 1.0 to about 1.5. When the coating compositions are used as room temperature drying paints, they are suitable for painting outdoor structures and heavy machinery and equipment too bulky to be passed through drying ovens.

Cure accelerators may be used in the coating composition. In the polyamine systems hydroxy functional materials such as alcohols, e.g. methanol and butanol and glycol ethers such as ethylene glycol monoethyl ether may be used. In the anhydride and polycarboxylic acid systems tertiary amines, such as triethyl amine, [2,2,2]- diazabicyclooctane and tetramethylguanadine may be used.

Curable compositions containing the polyglyiidamides can be modified by the addition of pigments, plasticizers, colorants, dyes, pigment dispersing agents, flow control agents, stabilizers and the like.

EXAMPLE 11

A coating composition is prepared from the hydroxy functional polyglycidamide solution of Example 1 by dissolving 63.6 parts of the polyglycidamide solution and 65.1 parts of a 63.7% solids solution in butyl acetate/xylene of an acrylate-itaconic anhydride copolymer of anhydride equivalent weight 415 in 6 parts of butyl acetate and 5 parts of isopropanol. To the solution, 14.8 parts of [2,2,2]-diazabicyclooctane are added to catalyze the reaction of the glycidamide and anhydride groups. The solution is coated onto primed phosphate treated steel panels to provide dried coatings of thickness in the range of 38 to 50 microns. The coatings are allowed to cure at room temperature or are cured thermally by subjecting them to a temperature of 82° C. for 30 minutes. They are then tested for solvent resistance and Tukon hardness by ASTM D-1474.

EXAMPLES 12-17

Similar coating compositions are prepared from Examples 3-8 and are labelled respectively Examples 12-17. Example 17 contains the non-hydroxy functional polyglycidamide used for comparison. Data are presented in Table 1.

TABLE 1
SOLVENT RESISTANCE AND HARDNESS OF CURED COATINGS

| Example | Solvent Resistance MEK (Double Rubs) | | | Hardness Tukon | | |
|---|---|---|---|---|---|---|
| | 24 hours/ 25° C. | 7 days/ 25° C. | 30'/ 82° | 24 hours/ 25° C. | 7 days/ 25° C. | 30'/ 82° C. |
| 11 | 15 | 100 | 75 | 4.4 | 9.0 | 8.9 |
| 12 | 40 | 100 | 100 | 4.2 | 11.0 | 11.3 |
| 13 | 45 | 100 | 100 | 4.7 | 11.1 | 10.3 |
| 14 | 10 | 100 | 100 | 4.1 | 5.0 | 6.1 |
| 15 | 40 | 100 | 100 | 4.5 | 9.2 | 8.5 |
| 16 | 50 | 100 | 100 | 4.5 | 9.5 | 11.5 |
| 17 | 6 | 16 | 35 | 2.4 | 4.1 | 4.0 |

I claim:

1. A hydroxy functional acrylamido amino resin composition represented by the formula $$Y(R)_m$$

wherein Y is a nucleus selected from the group consisting of:

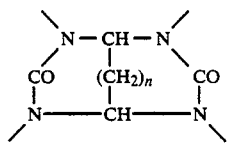 (a)

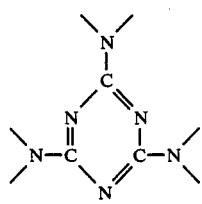 (b)

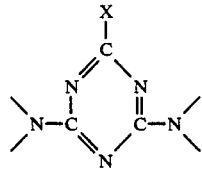 (c)

and

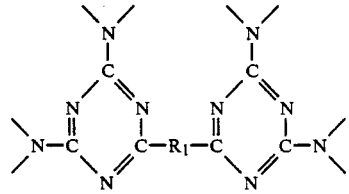 (d)

wherein R is selected from the group consisting of:

A. $(CH_2O)_p R_2$;
B. $CH_2OR_3$;
C. 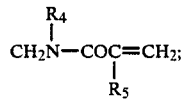

and

D. $(CH_2O)_q CH_2 R_6$;

wherein $R_1$ is a $C_1$ to $C_{10}$, linear or branched or cyclic, saturated or unsaturated divalent hydrocarbyl radical;

wherein $R_2$ is H, or a $C_1$ to $C_{10}$, linear or branched or cyclic, saturated or unsaturated aliphatic or aromatic monovalent hydrocarbyl radical but not more than one $R_2$ per Y nucleus is H;

wherein $R_3$ is a $C_2$ to $C_{10}$ linear or branched or cyclic, hydrocarbyl radical substituted with at least one hydroxy;

wherein $R_4$ and $R_5$ are independently selected from hydrogen and methyl;

wherein $R_6$ is $$[Y(R)_{m-2} - (CH_2O)_r - CH_2]_s - Y(R)_{m-1};$$

wherein X is a $C_1$ to $C_{10}$ linear or branched or cyclic, saturated or unsaturated aliphatic or aromatic monovalent hydrocarbyl radical;

wherein m is the equivalence of the Y nucleus and is in the range of 4 to 12;

wherein n, p, q and r are independently selected in the range of 0 to 1;

wherein the average s is in the range of 0 to 2;

wherein the average number of A groups per Y nucleus is in the range of 0 to 3, the average number of B groups is in the range to provide from 0.3 to 10 hydroxy substituents per molecule, the average number of C groups is in the range of 2 to 10 per molecule and wherein the average number of Y nuclei per molecule is in the range of about 1 to about 4.

2. The composition of claim 1 wherein $R_4$ and $R_5$ are hydrogen.

3. The composition of claim 1 wherein $R_2$ is a $C_1$ to $C_4$ alkyl group.

4. The composition of claim 1 wherein $R_2$ is methyl.

5. The composition of claim 1 wherein $R_2$ is butyl or isobutyl.

6. The composition of claim 1 wherein the average number of B groups is in the range to provide from 1 to 3 hydroxy substituents per molecule and the average number of C groups is in the range of 2 to 6 per molecule.

7. The composition of claim 1 wherein the nucleus is a melamine nucleus.

8. The composition of claim 1 wherein the nucleus is a melamine nucleus, $R_2$ is a $C_1$ to $C_4$ alkyl group, $R_3$ is a $C_2$ to $C_{10}$ alkyl or cycloalkyl radical substituted with a secondary hydroxy, $R_4$ and $R_5$ are hydrogen and the average number of melamine nuclei per molecule is in the range of 1 to 3 and wherein there are from 0.4 to 4 hydroxy groups per molecule and from 2 to 6 acrylamidomethyl groups per per molecule.

9. A hydroxyl functional acrylamido amino resin composition represented by the formula $Y(R)_m$, wherein Y is a nucleus represented by the formula

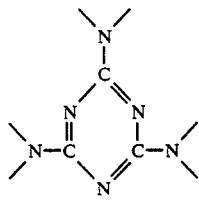

wherein R is selected from the group consisting of:

A. $(CH_2O)_p R_2$;
B. $CH_2OR_3$;
C. $CH_2NHCOCH=CH_2$; and
D. $(CH_2O)_q CH_2R_6$;

wherein $R_2$ is H or a $C_1$ to $C_{10}$, linear or branched or cyclic, saturated or unsaturated, aromatic or aliphatic, monovalent hydrocarbyl radical but not more than one $R_2$ per Y nucleus is H;

wherein $R_3$ is a $C_2$ to $C_{10}$ linear or branched or cyclic hydrocarbyl radical substituted with a hydroxy group;

wherein $R_6$ is $[Y(R)_{m-2} - (CH_2O)_r - CH_2]_s - Y(R)_{m-1}$;

wherein m is 6;

wherein p, q and r are independently selected in the range of 0 to 1;

wherein the average s is in the range of 0 to 2;

wherein the average number of A groups per Y nucleus is in the range of 0 to 3, the average number of B groups per molecule is in the range of 0.4 to 10, the average number of C groups per molecule is in the range of 2 to 10 and the average number of Y nuclei per molecule is in the range of about 1 to about 4.

10. The composition of claim 9 wherein $R_2$ is selected from the group consisting of methyl, butyl, isobutyl and 2-ethylhexyl, wherein the B group is a $C_3$ to $C_{10}$ hydrocarbyl radical and the hydroxy substituent is predominantly secondary and wherein the average number of Y nuclei per molecule is in the range of 1 to 3.

11. A process for the preparation of a hydroxy functional acrylamido amino resin composition represented by the formula $Y(R)_m$ wherein Y is a nucleus selected from the group consisting of:

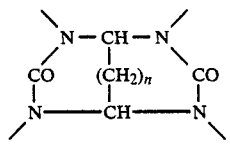 (a)

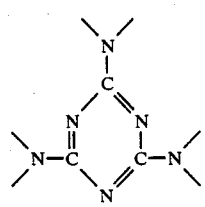 (b)

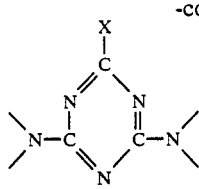 (c)

and

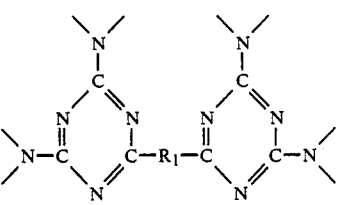 (d)

wherein R is selected from the group consisting of:

$(CH_2O)_p R_2$;   A.
$CH_2OR_3$;   B.

$\begin{array}{c} R_4 \\ | \\ CH_2N-COC=CH_2; \\ | \\ R_5 \end{array}$   C.

and
$(CH_2O)_q CH_2R_6$;   D.

wherein $R_1$ is a $C_1$ to $C_{10}$, linear or branched or cyclic, saturated or unsaturated, divalent hydrocarbyl radical;

wherein $R_2$ is H, or a $C_1$ to $C_{10}$, linear or branched or cyclic, saturated or unsaturated, aliphatic or aromatic monovalent hydrocarbyl radical but not more than one $R_2$ per Y nucleus is H;

wherein $R_3$ is a $C_2$ to $C_{10}$ linear or branched or cyclic, hydrocarbyl radical substituted with at least one hydroxy;

wherein $R_4$ and $R_5$ are independently selected from hydrogen and methyl;

wherein $R_6$ is $[Y(R)_{m-2} - (CH_2O)_r - CH_2]_s - Y(R)_{m-1}$;

wherein X is a $C_1$ to $C_{10}$ linear or branched or cyclic, saturated or unsaturated or epoxidized, aliphatic or aromatic monovalent hydrocarbyl radical;

wherein m is the equivalence of the Y nucleus and is in the range of 4 to 12;

wherein n, p, q and r are independently selected in the range of 0 to 1;

wherein the average s is in the range of 0 to 2;

wherein the average number of A groups per Y nucleus is in the range of 0 to 3, the average number of B groups is in the range to provide from 0.3 to 10 hydroxy substituents per molecule, the average number of C groups is in the range of 2 to 10 per molecule and wherein the average number of Y nuclei per molecule is in the range of about 1 to about 4;

wherein the process comprises methylolating a cyclic urea or aminotriazine with formaldehyde, etherifying the methylolated product with a $C_1$ to $C_{10}$ alcohol to produce an alkoxymethylated product, transetheramidizing the alkoxymethylated product with an acrylamide to replace a fraction of the alkoxymethyl groups with acrylamidomethyl groups, and transetherifying with a polyol to replace a further fraction of the alkoxymethyl groups with (hydroxy-substituted-alkoxy)methyl groups.

12. The process of claim 13 wherein the polyol is a $C_3$ to $C_{10}$ diol containing one primary and one secondary hydroxy group.

* * * * *